UNITED STATES PATENT OFFICE.

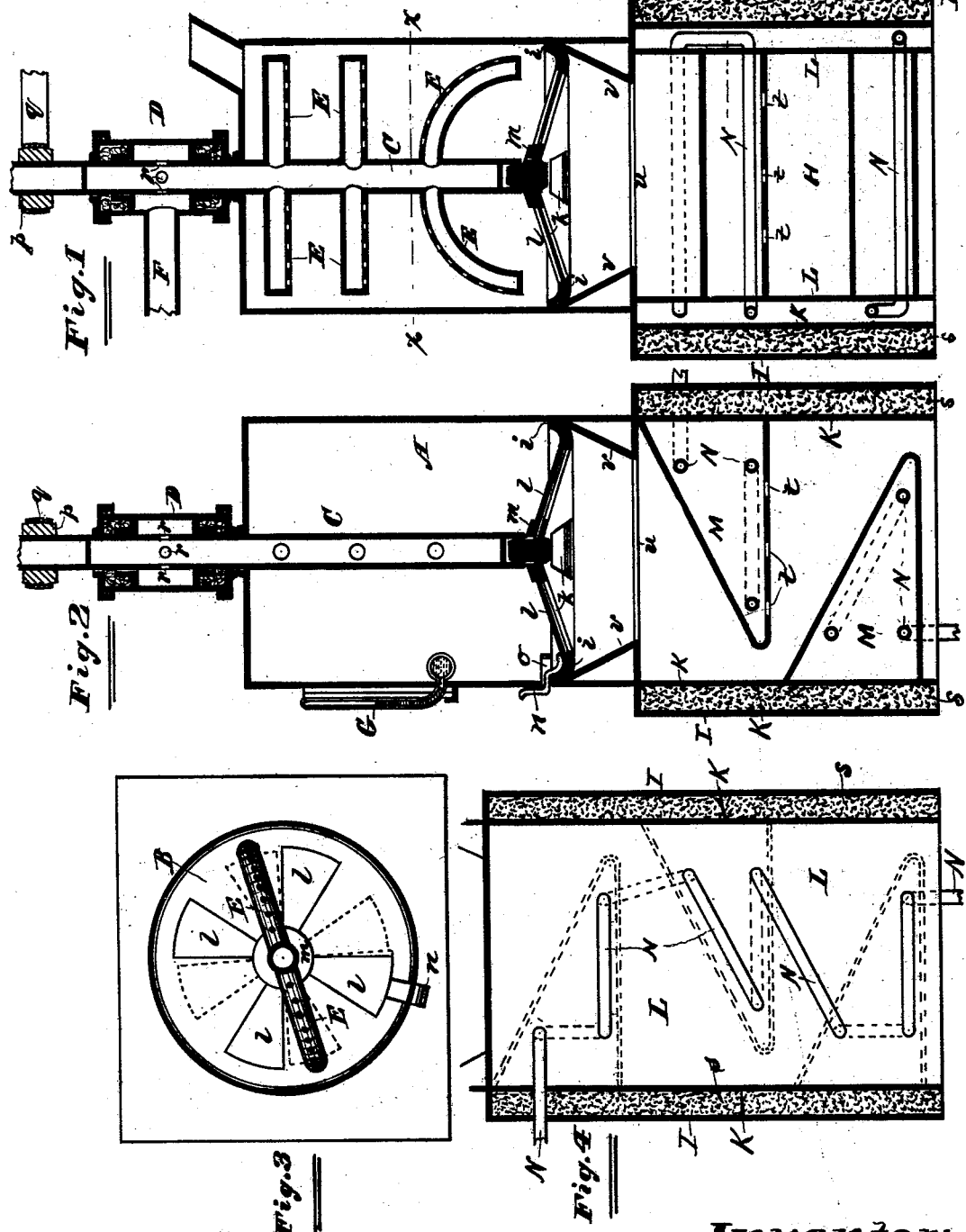

TAYLOR E. DANIELS, OF CHICAGO, ILLINOIS.

IMPROVEMENT IN COMBINED STEAM FEED COOKER AND DRIER.

Specification forming part of Letters Patent No. 218,497, dated August 12, 1879; application filed June 27, 1879.

*To all whom it may concern:*

Be it known that I, TAYLOR E. DANIELS, of the city of Chicago, in the county of Cook and State of Illinois, have invented certain new and useful Improvements in Steam Feed Cooker and Drier; and I hereby declare the following to be a full, clear, and exact description thereof, reference being had to the accompanying drawings, of which—

Figures 1 and 2 are vertical central sections of my apparatus, taken at right angles to each other; Fig. 3, a horizontal section on the line $x\ x$, Fig. 1; and Fig. 4, a side view of the drier with one exterior wall removed.

My invention relates to apparatus for cooking by the direct application of steam, and subsequently drying by steam heat feed of various kinds for domestic animals.

Cooked feed judiciously mixed has fully proved itself to be far more easily digested, and hence more wholesome and nutritious, than raw, not only for horses, but for milch-cows also, the milk being enhanced both in quantity and quality thereby, and for stock generally.

It is a demonstrated fact that many of the diseases to which horses and other domestic animals are subject are superinduced by raw grain, and that they never appear when the grain is administered in a cooked state. Colic, in probably nine cases out of ten, is due to the gases generated by the excessive fermentation of raw grain in process of digestion, which fermentation is productive also of various other effects less violent and direct, but often equally injurious. Worms, which infest the stomachs and intestines of animals fed upon raw grain, are seldom present, and never in large numbers or of large size, when cooked feed is used; and, moreover, cooked feed tends both to maintain the blood at a cool and even temperature and the bowels in a regular and healthy condition.

Nature, therefore, calls as emphatically in the case of domestic animals as in that of civilized man for cooked food, and the demand, as usual, manifests itself in the desires, the animals invariably exhibiting a decided preference for such food as has been cooked, by consuming it before they touch the uncooked when given their free choice between the two.

In preparing food as above for market purposes, it is not only requisite that it be cooked, but also that it be thoroughly dried, in order that it may keep in a perfectly pure state, and both the cooking and drying should be uniform and thorough without, as to the first, being excessive.

The object of my invention is to produce apparatus for cooking feed by the direct injection of steam into all parts of the interior of the same, and subsequently drying it by means of steam-pipes, the whole being effected in one continuous process.

To this end my invention consists in a receptacle for the material to be treated, cylindrical in form, and having at a short distance above its lower end a conical diaphragm provided with valved openings for the discharge of the material, the valves being capable of regulation from without, and a central vertical revolving steam-pipe having radial perforated branch pipes within the cylindrical case, the lowest pair or set curving downward, for reasons which will hereinafter appear, the whole being superposed upon a drier comprising a rectangular case, having its walls lined with a non-heat-conducting substance, and hollow wedge-shaped shelves projecting alternately with their upper sides sloping downward from two opposite walls, and a closed steam-pipe convolved back and forth within the hollow of the said shelves, each of which, with the exception of the lowest, has its lower face perforated for the escape of the heat into the body of the drier, all as hereinafter more fully set forth.

In the drawings, A is the cylindrical case of the cooker, having a hopper, $h$, at the top; and B, the conical diaphragm, which is turned upward at its outer edges, as shown at $i$, and provided with segmental openings $k$, regulated simultaneously by means of dampers $l$, radiating from a central disk or collar, $m$, and operated by means of an arm, $n$, projecting through an elongated horizontal slot, $o$, in the wall.

C is a vertical hollow pipe resting on a pivot upon the conical diaphragm, passing through the top of the case A, and also through a hollow packed cylinder or stuffing-box, D, surmounting the same, and revolved by means of a pulley, p, and belt q, or by any other suitable appliance.

E E are perforated branch pipes radiating from two or more sides of the pipe C nearly to the wall of the case A. These branch pipes are all straight with the exception of the lowest set, which curve downward nearly to the diaphragm B, whereby, as they revolve, they serve to direct the cooked material through the openings k.

F is a pipe entering the box D, for the injection of steam, which latter finds its way into the pipe C through apertures r in the same, within the said box, in line with the orifice of the said pipe F.

A thermometer, G, extending up the exterior wall of the case, and with its bulb inside the said case, affords means for determining the degree of heat at all times.

H is the rectangular drier below the cooker above described, with double walls I K on all sides, filled with asbestus or some other non-conductor of heat, s, and, preferably, with a third interior wall, L, on two sides, at short distances from the walls K.

M M are hollow wedge-shaped shelves attached, as shown, to the opposite walls K, the upper face of each sloping nearly to that of the next below, and the lower face of all except the lowest being provided with perforations t.

The cooker and drier communicate through an opening, u, in the top of the latter, and it is well to have the sides of the case A shelve inward toward this opening, as shown at r, both in order to direct all the cooked material upon the first sloping shelf and to prevent its lodging in the angles.

N is a steam-pipe passing through the wall of the drier from without into the space between the walls K and L, then back and forth several times through each hollow shelf M, and finally out of the drier, as shown.

The operation of my apparatus is as follows: The feed to be cooked, previously ground, as a rule, is charged into the receptacle A through the hopper h (originally with the valves l closed) until the said receptacle is nearly full. The pipe C is then set revolving, and steam admitted to it through the pipe F, said steam of course passing out at the perforations in the branch pipes E into the interior of the feed. The revolving branch pipes, while discharging hot steam into every part of the feed, serve also as agitators for the same, causing every part to be thoroughly acted on.

When the initial charge has been sufficiently cooked the valves l should be opened wide enough to allow the material to fall into the drier.

The lower branch pipes, E, it will be seen, owing to their downward curve and constant rotation, serve to stir the mass through the openings and prevent its clogging upon the intervening portions of the diaphragm. The dished edges i also aid in producing this result.

As soon as the valves have been opened the charging of fresh material through the hopper h may be made continuous, the size of the openings k being graduated to such a degree that the feed will be thoroughly cooked in the time of passing from the top to the bottom of the receptacle A.

After leaving the cooker the feed falls upon the first inclined shelf M, and, after shifting from one to another of the shelves, (which may of course be in any required number,) finally passes out at the base of the drier.

The steam-pipe N produces a very high temperature within the drier, and but little of the heat escapes, owing to the thorough insulation above described. The upper portions of the wedge-shaped shelves are especially heated, since they confine the pipe N from above and receive the uprising heat, and the air within the drier is heated by direct contact with the said pipe, owing to the perforations in the lower face.

All this permits the reduction of the height of the drier to a minimum.

The innermost wall, L, serves to inclose the pipe N at the turns, where otherwise it might tend to arrest the descent of the drying substance.

While my apparatus is especially designed for cooking and drying feed for animals, it is also in every way suitable for treating sweet corn, pop-corn, and other grains, either previously ground or not, for human consumption.

What I claim as new, and desire to secure by Letters Patent, is—

1. The steam feed-cooker consisting of the receptacle A, having the conical diaphragm B, provided with valved openings, as described, with means for regulating the same from without, the vertical revolving pipe C, having radial perforated branch pipes E, and passing through the stuffing-box D, within which it is provided with openings r, and the steam-pipe F, entering the said box D, substantially as set forth and shown.

2. The apparatus for preparing cooked feed for animals, comprising a steam feed-cooker operating in conjunction with a suitable drier, said cooker consisting of the receptacle A, having the conical diaphragm B, provided with valved openings and means for regulating the same from without, the vertical revolving pipe C, having radial perforated branch pipes E, and passing through the stuffing-box D, within the confines of which it is provided with openings r, and the steam-pipe F, entering the said box D, substantially as described.

3. The drier consisting of the rectangular case H, having double walls filled with a non-heat-conducting substance, as shown, the oppositely-inclined hollow wedge-shaped shelves M, perforated in their lower faces and attached alternately to opposite walls of the said drier, and steam-pipe N, entering the drier, passing repeatedly back and forth through the interior of the shelves M, and ultimately passing out of the said drier, substantially as set forth and shown.

4. The apparatus for preparing cooked feed for animals, comprising a suitable cooker operating in conjunction with a drier, said drier consisting of the rectangular case H, having double walls filled with a non-heat-conducting substance, the oppositely-inclined hollow wedge-shaped shelves M, perforated in their lower faces and attached alternately to opposite walls of the drier, and the steam-pipe N, entering the drier, passing repeatedly back and forth through the interior of the shelves M, and ultimately passing out of the drier, substantially as described.

TAYLOR E. DANIELS.

In presence of—
  FREDERICK A. SMITH,
  G. A. FOLLANSBEE.